United States Patent
Arakkakudy et al.

(10) Patent No.: US 8,913,867 B2
(45) Date of Patent: Dec. 16, 2014

(54) FIBER OPTIC COLLECTOR AND TERMINAL ASSEMBLIES

(75) Inventors: Biji Mathew Arakkakudy, Kochi (IN); Mukund Muraleedharan, Kochi (IN); Sudhakaran K. Sanith, Kochi (IN); Kizhakkekuttu Parameswaran Chandran, Kochi (IN); K. R. Suresh Nair, Kochi (IN)

(73) Assignee: Opterna Technology Limited, Limerick (IE)

( * ) Notice: Subject to any disclaimer, the term of this patent is extended or adjusted under 35 U.S.C. 154(b) by 93 days.

(21) Appl. No.: 13/300,769

(22) Filed: Nov. 21, 2011

(65) Prior Publication Data

US 2013/0129295 A1 May 23, 2013

(51) Int. Cl.
*G02B 6/44* (2006.01)

(52) U.S. Cl.
CPC .............. *G02B 6/44* (2013.01); *G02B 6/4452* (2013.01)
USPC ......................................................... 385/135

(58) Field of Classification Search
CPC .................................................... G02B 6/4452
USPC ......................................................... 385/135
See application file for complete search history.

(56) References Cited

U.S. PATENT DOCUMENTS

| | | | |
|---|---|---|---|
| 5,551,545 A | 9/1996 | Gelfman | |
| 6,220,413 B1 | 4/2001 | Walters et al. | |
| 6,396,989 B1 | 5/2002 | Johnston et al. | |
| 6,554,221 B2 | 4/2003 | Hinds | |
| 6,711,339 B2 | 3/2004 | Puetz et al. | |
| 6,796,721 B2 | 9/2004 | Matsumoto et al. | |
| 7,017,846 B2 | 3/2006 | Tsoi et al. | |
| 7,027,704 B2 * | 4/2006 | Frohlich et al. | 385/135 |
| 7,292,763 B2 | 11/2007 | Smith et al. | |
| 7,327,926 B2 | 2/2008 | Barth et al. | |
| 7,340,144 B2 | 3/2008 | Dobbins et al. | |
| 7,346,253 B2 | 3/2008 | Bloodworth et al. | |
| 7,496,268 B2 * | 2/2009 | Escoto et al. | 385/134 |
| 7,623,749 B2 * | 11/2009 | Reagan et al. | 385/135 |
| 7,756,379 B2 | 7/2010 | Kowalczyk et al. | |
| 7,894,701 B2 | 2/2011 | Kowalczyk et al. | |
| 7,936,962 B2 * | 5/2011 | Mudd et al. | 385/135 |
| 8,406,597 B2 * | 3/2013 | Case | 385/135 |
| 2005/0156310 A1 * | 7/2005 | Benner et al. | 257/712 |
| 2006/0210230 A1 | 9/2006 | Kline et al. | |
| 2006/0228086 A1 * | 10/2006 | Holmberg et al. | 385/135 |
| 2007/0189691 A1 * | 8/2007 | Barth et al. | 385/135 |
| 2008/0170831 A1 * | 7/2008 | Hendrickson et al. | 385/135 |
| 2008/0292261 A1 | 11/2008 | Kowalczyk et al. | |
| 2009/0074370 A1 | 3/2009 | Kowalczyk et al. | |
| 2009/0103879 A1 * | 4/2009 | Tang et al. | 385/135 |
| 2009/0226143 A1 * | 9/2009 | Beck | 385/135 |
| 2010/0310224 A1 | 12/2010 | Kowalczyk et al. | |

(Continued)

*Primary Examiner* — Charlie Y Peng
(74) *Attorney, Agent, or Firm* — Sterne, Kessler, Goldstein & Fox P.L.L.C.

(57) ABSTRACT

A fiber optic collector and terminal assembly (CTA) can include a multi-fiber optic cable having a tail portion and first and second multi-fiber branches optically coupled to the tail portion. The first and second multi-fiber optic branches each have fewer fibers than the tail portion. The CTA also includes a plurality of single-fiber optic jumpers optically coupled to the first multi-fiber optic branch. Additionally, the CTA includes an adapter for securing a connection between a fiber of one of the plurality of single-fiber optic jumpers and a fiber of a single-fiber optic drop.

19 Claims, 5 Drawing Sheets

(56) References Cited

U.S. PATENT DOCUMENTS

2011/0311226 A1* 12/2011 Smith et al. .................. 385/135
2012/0328258 A1* 12/2012 Barron et al. ................. 385/135
2013/0034336 A1* 2/2013 Cassell et al. ................. 385/135

* cited by examiner

FIBER OPTIC COLLECTOR AND TERMINAL ASSEMBLIES

BACKGROUND

1. Field

The present invention relates to fiber optic networks and, more particularly, to fiber optic collector and terminal assemblies for use in multi-unit applications.

2. Background

In some fiber-to-the-premises applications, the fiber optic network terminates at a multi-unit building having a plurality of separating units needing to be connected to the fiber optic network. To distribute the signal transmission from a main fiber optic feeder cable to each separate unit of the multi-unit building, a system including a plurality of fiber optic devices, for example, fiber distribution hubs, collector assemblies, and fiber distribution terminals, and fiber optic cables connecting the fiber optic devices are used. However, installing these fiber optic systems in multi-unit buildings can be difficult due to space limitations. Simply, there is not enough room within the building to install the fiber optic devices, especially in older buildings that are being retro-fitted with the fiber optic systems.

Accordingly, there is need for fiber optic systems that have a smaller footprint within multi-unit buildings and that simplify installation.

SUMMARY

A fiber optic system can include a collector and terminal assembly (CTA). The CTA includes a multi-fiber optic cable having a tail portion and first and second multi-fiber branches optically coupled to the tail portion. The first and second multi-fiber optic branches each have fewer fibers than the tail portion. The CTA also includes a plurality of single-fiber optic jumpers optically coupled to the first multi-fiber optic branch. Additionally, the CTA includes an adapter for securing a connection between a fiber of one of the plurality of single-fiber optic jumpers and a fiber of a single-fiber optic drop.

The fiber optic system can also include a fiber distribution terminal (FDT). The FDT includes a second multi-fiber optic cable operatively coupled to the second multi-fiber optic branch, and a second plurality of single-fiber optic jumpers optically coupled to the second multi-fiber optic cable. Additionally, the FDT includes a second adapter for securing a connection between a fiber of one of the second plurality of single-fiber optic jumpers and a fiber of a second single-fiber optic drop.

BRIEF DESCRIPTION OF THE DRAWINGS

Embodiments of the invention will now be described, by way of example only, with reference to the accompanying schematic drawings in which corresponding reference symbols indicate corresponding parts.

DETAILED DESCRIPTION

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
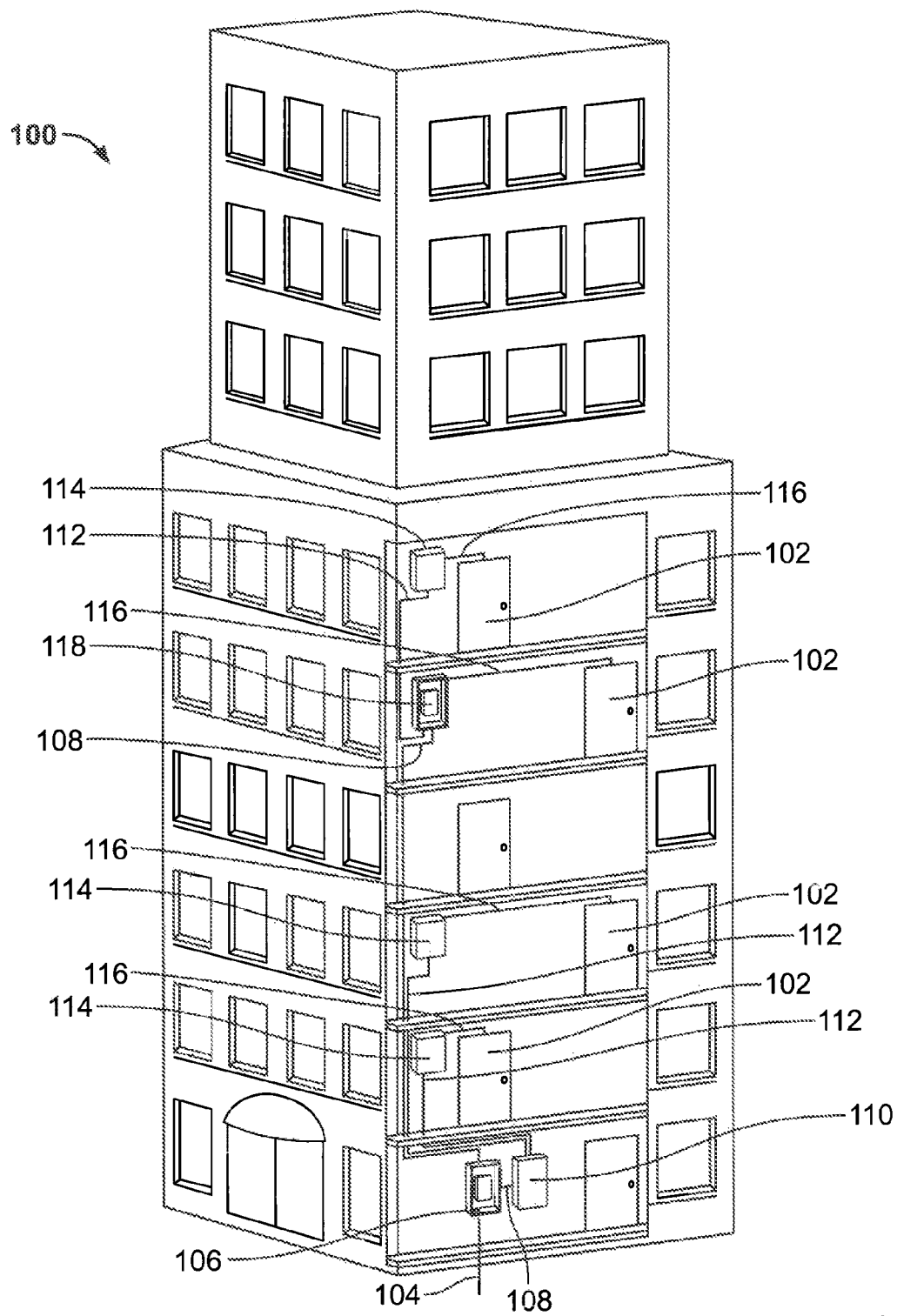
FIG. 1 depicts a multi-unit building with installed fiber optic systems.

Fiber-to-the-premises applications can include a fiber optic network distributed throughout a multi-unit building. FIG. 1 depicts fiber optic systems installed in a multi-unit building 100 that includes a plurality of separate units 102. Multi-unit building 100 can be, for example, an apartment building or an office building having one or more separate units 102, for example, apartments or offices, that need fiber optic cable service. Although each separate unit 102 typically only needs a single fiber connection, the entire multi-unit building 100 needs a plurality of fibers to service every unit 102. To service multi-unit building 100, the fiber optic cable provider will typically run a fiber optic feeder cable 104 to a fiber distribution hub (FDH) 106 that splits the signal transmission. Fiber optic feeder cable 104 can include 1, 12, 24, 48, 72, or any other suitable number of fibers. FDH 106 can be outside or inside multi-unit building 100. Exiting from FDH 106 are one or more multi-fiber distribution cables 108. Multi-fiber distribution cable(s) 108 can have, for example, 72 fibers, 144 fibers, or any other suitable number of fibers. Often, one multi-fiber distribution cable 108 is coupled to a collector assembly 110 that splits multi-fiber distribution cable 108 into a plurality of smaller intermediate multi-fiber optic cables 112, each having fewer fibers than multi-fiber distribution cable 108. Smaller intermediate multi-fiber optic cables 112 can each have, for example, 12 fibers or any other suitable number of fibers. Each smaller intermediate multi-fiber optic cable 112 is optically coupled to a fiber distribution terminal (FDT) 114. FDT 114 optically couples the smaller intermediate multi-fiber optic cable 112 to a plurality of single-fiber drops 116. Single-fiber drops 116 are coupled to optical network terminals at separate units 102 of multi-unit building 100. The optical network terminals are coupled to fiber-optic devices that translate the fiber cable signal into useful information.

FDH 106 and collector assembly 110 are commonly located in a telecommunication room on a lower level of multi-unit building 100, and each floor of multi-unit building 100 can have one or more FDTs 114. Two issues faced when installing a fiber optic network in a multi-unit building is that there is not enough space in the building to install FDH 106, collector assembly(s) 110, and FDTs 114 and that such installations require a complex architecture. For example, in a high-rise multi-unit building, a plurality of collector assemblies 110 are typically located in the telecommunication room, and a plurality of intermediate multi-fiber optic cables 112 run from each collector assembly 110 to the respective FDTs 114 on each floor of the building. Accordingly, there is need for a fiber-optic system that has a smaller footprint within multi-unit building 100 and that simplifies the installation.

Accordingly, a fiber optic system for use in multi-unit building 100, as shown in FIG. 1, can include one or more collector and terminal assemblies (CTAs) 118 and one or more FDTs 114 optically coupled to CTA(s) 118. CTA 118 can be located on any floor of multi-unit building 100, for example, the fifth floor of multi-unit building 100 as shown in FIG. 1. CTA 118 is optically coupled to FDH 106 on the input side. On the output side, CTA 118 is optically coupled to one or more optical network terminals at single units 102 and to one or more FDTs 114. In high-rise multi-unit buildings, a CTA 118 can be located a pre-determined number of floors apart from another CTA 118. For example, a CTA 118 can be installed on every fifth floor.

Figure 2:
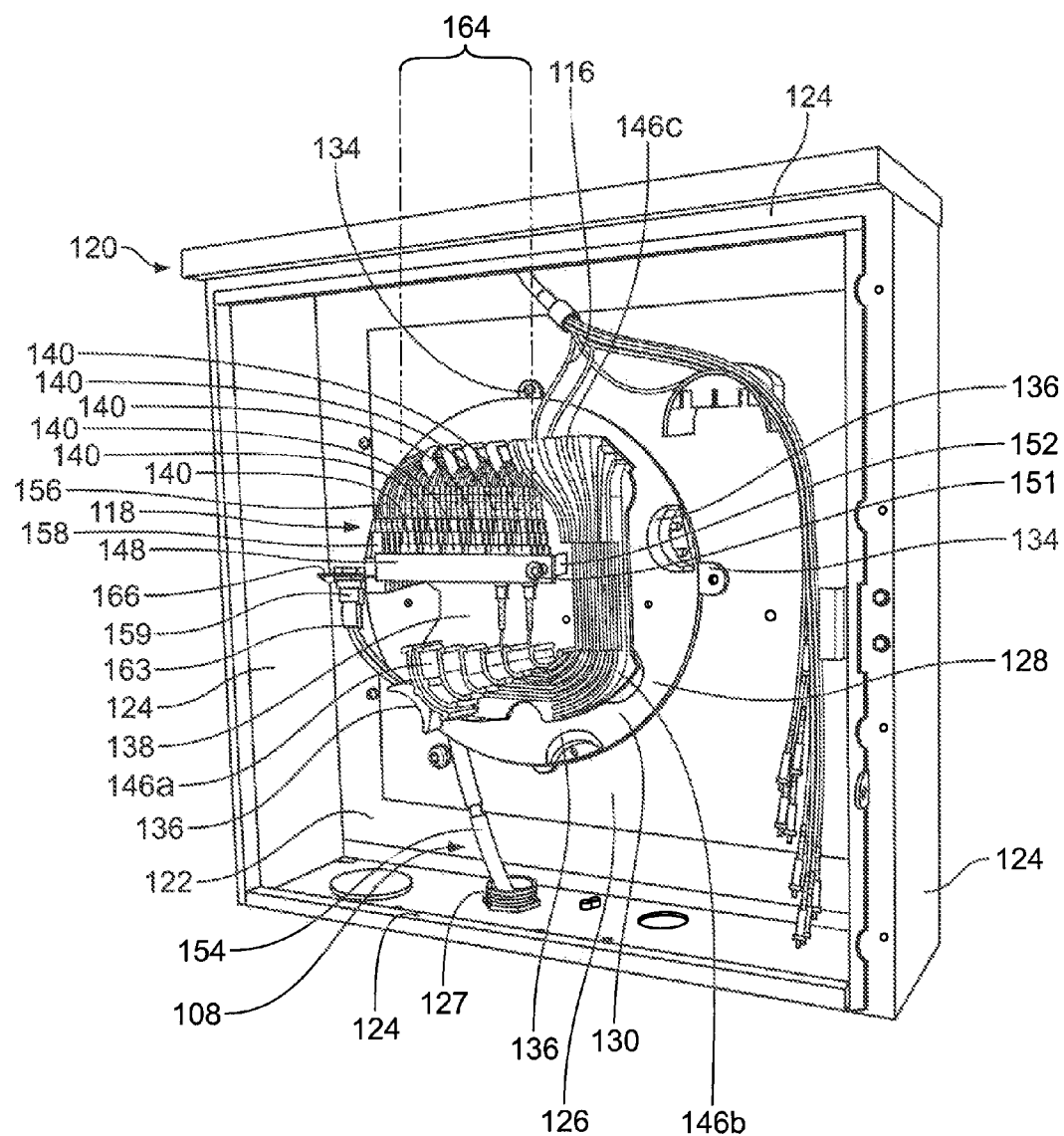
FIG. 2 is a perspective view of a collector and terminal assembly installed in an enclosure.

CTA 118 can be mounted within an enclosure, for example, a pre-installed electrical enclosure, or CTA 118 can be mounted directly to a mounting surface without an enclosure, for example, a wall within a telecommunication room. FIG. 2 illustrates a perspective view of CTA 118 mounted within an enclosure 120. Enclosure 120 has a back surface 122 and sidewalls 124 that extend from the edges of back surface 122. Enclosure 120 can also have a front pivoting lid (not shown) for completely and selectively encasing CTA 118 within enclosure 120. Sidewalls 124 can have one or more openings 127 for passing optical fiber cables to and from CTA 118. Enclosure 120 can also include an optional fastener plate 126. Fastener plate 126 can be any suitable material, for example, wood, for receiving fasteners, such as bolts or screws, to fix CTA 118 within enclosure 120.

CTA 118 includes a base plate 128. Base plate 128 can have any suitable shape, for example, a rectangle, an oval, or a circle as shown in FIG. 2. Base plate 128 is made of any rigid or semi-rigid material, for example, metal or plastic. Base plate 128 has a front surface 130 and a back surface 132 (see FIG. 4). Extending rearward from base plate 128 are one or more brackets 134. Brackets 134 have a length sufficient to space base plate 128 away from the surface upon which CTA 118 is mounted, for example, fastener plate 126. Each bracket 134 has an L-shape. The flange of each L-shaped bracket 134 contacts the mounting surface of, for example, a wall. Brackets 134 can have an opening for receiving a fastener used to couple CTA 118 to the mounting surface.

CTA 118 also includes one or more peripheral cable guides 136. Cable guides 136 extend from front surface 130 of base plate 128. Cable guides 136 are spaced apart around the periphery of base plate 128. Cable guides 136 are configured to securely organize and maintain any cables within the periphery of CTA 118.

CTA 118 also includes an adapter plate 138. Adapter plate 138 can be integral with base plate 128 or can be a separate part attached to base plate 128 by any suitable attachment means, for example, fasteners or adhesive. Adapter plate 138 is configured to securely maintain one or more adapters 140. Adapters 140 can be any suitable adapter for optically coupling one or more fibers of a first optical fiber cable to respective one or more fibers of a second optical fiber cable. For example, adapters 140 can be Splice Closure/Angled Physical Contact (SC/APC) adapters. Use of adapters 140 is explained in more detail below.

Figure 3:
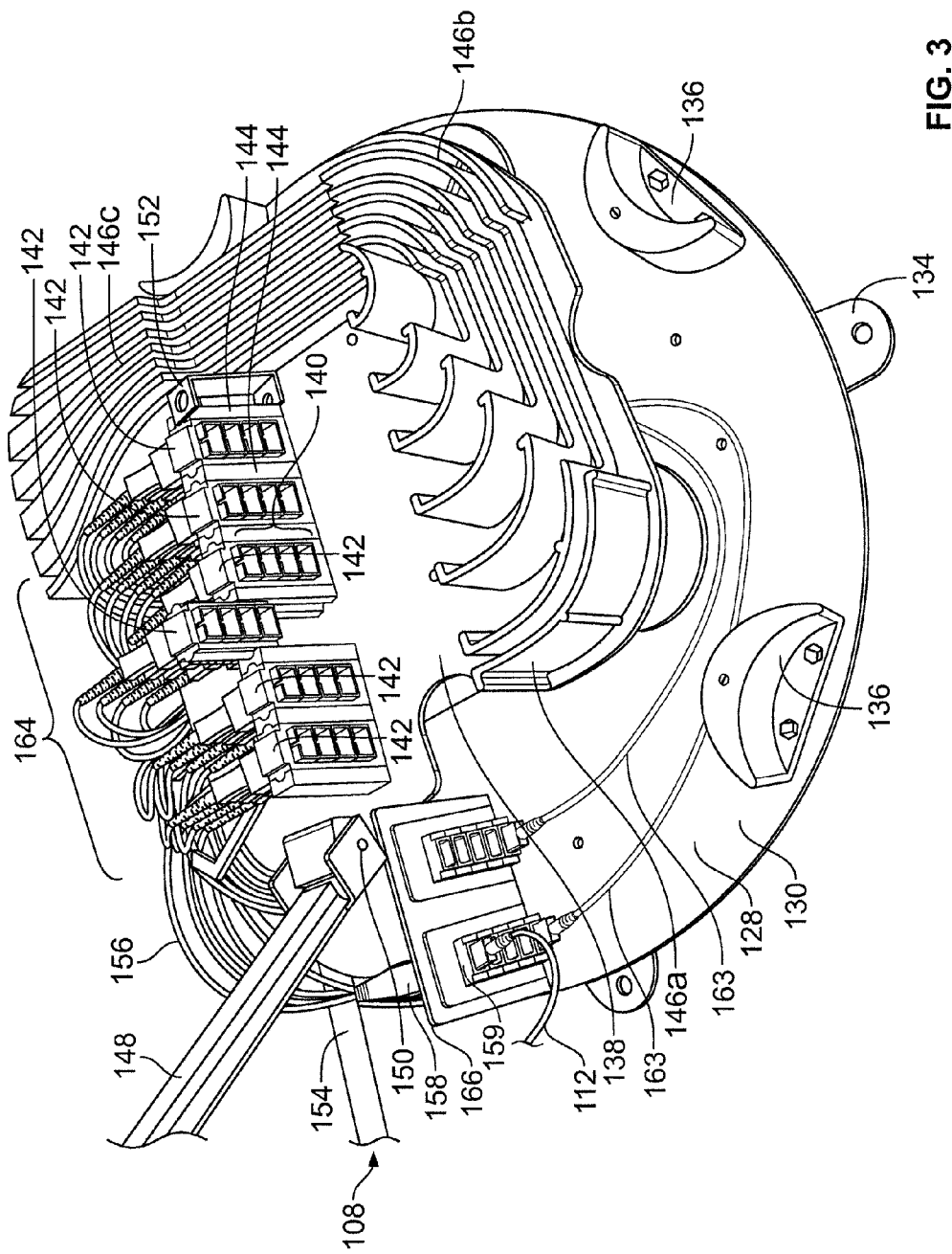
FIG. 3 is an enlarged perspective view of the collector and terminal assembly.

Adapters 140 can be retained in CTA 118 by any suitable adapter retaining system. For example, CTA 118 can use any one of the adapter retaining systems discussed in U.S. application Ser. No. 13/300,727, filed Nov. 21, 2011, the disclosure of which is incorporated herein by reference. For example, as shown in FIG. 3, adapters 140 can be housed in one or more adapter packs 142. Adapter packs 142 are configured to be slidably disposed on adapter plate 138 such that adapter packs 142 can move away from and towards adapter plate 138. CTA 118 includes six adapter packs 142, each housing four adapters 140. Each adapter pack 142 is slidably disposed between a pair of adapter posts 144, creating a sliding interface there between. For example, adapter pack 142 can have a protrusion that extends from both sidewalls of adapter pack 142, and adapter posts 144 can each have a groove sized to receive the respective protrusion of adapter pack 142. In another embodiment, adapters 140 can be slidably received directly between posts 144, creating a sliding interface there between without adapter packs 142.

Adapter plate 138 can include a set of cable guides 146. Single-fiber drops 116 are routed from adapters 140 through a series of cable guides 146. Guides 146 can be separate parts coupled to adapter plate 138, or guides 146 can be integral with adapter plate 138. Guides 146 extend substantially perpendicularly from one (typically, a front) surface of adapter plate 138. Guides 146 define a plurality of curved channels for receiving single-fiber drops 116. Guides 146 are designed to maintain signal integrity of single-fiber drops 116. The curved channels of guides 146 can have specific radii that do not allow single-fiber drops 116 to bend more than the specification of single-fiber drops 116 allows, thereby minimizing bend loss within single-fiber drops 116. Thus, guides 146 provide a convenient and organized way to route single-fiber drops 116 through CTA 118.

Adapter plate 138 and guides 146 are sized such that up to 70 mm cable connection boots, which are sleeves usually made of a flexible material that add a layer of protection to the connector, and up to 4.8 mm diameter cables can be used. Adapter plate 138 and guides 146 are also sized such that the use of Splice On Connectors (SOCs) is 138 and guides 146 are also sized such that the use of Splice On Connectors (SOCs) is facilitated. SOCs eliminate the need for field polishing of fiber cables to terminate connections. As shown in FIG. 3, CTA 118 includes three guides 146a, 146b, and 146c so that single-fiber drops 116 can make two 90 degree turns and be fanned out. However, more or less than three guides 146 may be needed based on the internal routing of enclosure 120, if used, and the bend tolerance specification of the particular single-fiber drops 116 used. After exiting CTA 118, single-fiber drops 116 are routed out of enclosure 120 through an opening in sidewall 124 of enclosure 120.

In another embodiment, base plate 128 can serve as adapter plate 138. In such an embodiment, cable guides 146 can extend from the plane of base plate 128, and adapters 140 can be slidably disposed on base plate 128.

CTA 118 also includes a lock that limits movement of adapters 140 (and adapter packs 142 if included). The lock can include an elongated plate 148 that can selectively overlay adapters 140, impeding movement of adapters 140 away from adapter plate 138. Elongated plate 148 pivots about a hinge 150. As shown in FIG. 3, elongated plate 148 rotates about a plane substantially perpendicular to the plane of adapter plate 138. In other embodiments, elongated plate 148 can rotate about other planes, for example, a plane substantially parallel to the plane of adapter plate 138. The lock can also include a latch 151. Latch 151 is configured to selectively couple to post 152, preventing rotation of elongated plate 148.

Figure 4:
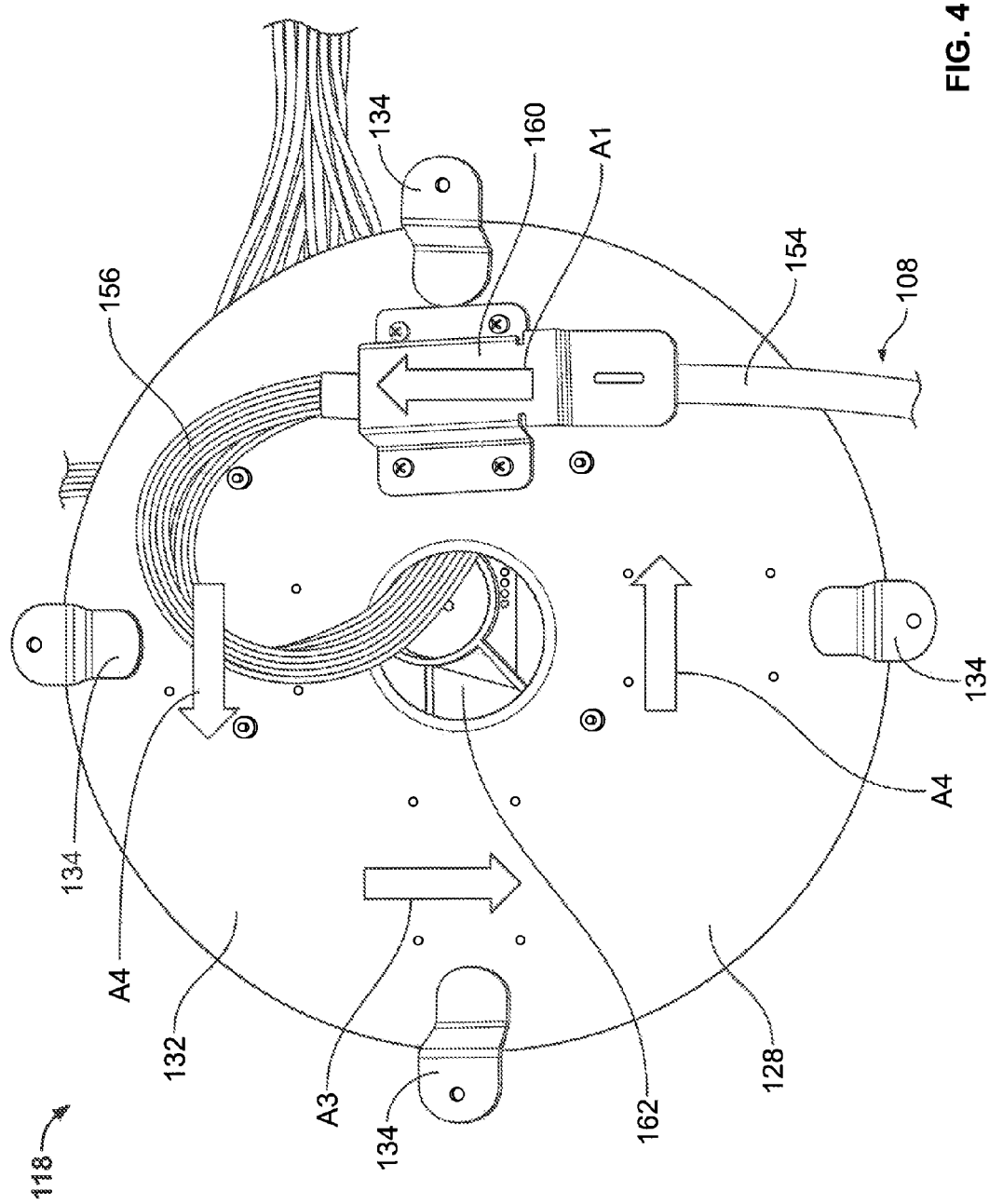
FIG. 4 is a rear view of the collector and terminal assembly.

FIG. 4 illustrates the rear of CTA 118. As shown in FIG. 4, CTA 118 includes a multi-fiber optic distribution cable 108. Multi-fiber optic distribution cable 108 is configured to be optically coupled to FDH 106. Multi-fiber optic cable 108 can have either 72 or 144 fibers. In other embodiments, multi-fiber optic cable 108 can have more than 144 fibers, less than 72 fibers, or any number there between. Multi-fiber optic cable 108 includes a tail portion 154. All the fibers of multi-fiber optic cable 108 are contained within a single jacket within tail portion 154. Tail portion 154 can be a riser-rated fiber optic cable, and tail portion 154 can be suited for indoor or outdoor use. Tail portion 154 can have a length of 50 ft., 100 ft., 200 ft., 350 ft., or any other suitable length.

From tail portion 154, multi-fiber optic cable 108 branches into a plurality of multi-fiber branches 156. The number of fibers in each multi-fber branch 156 is less than the number of fibers in tail portion 154. For example, each multi-fiber branch 156 can have 12 fibers. In embodiments in which multi-fiber optic cable 108 has 144 fibers, CTA 118 can have twelve multi-fiber branches 156 of 12 fibers each. In embodiments in which multi-fiber optic cable 108 has 72 fibers, CTA 118 can have six multi-fiber branches 156 of 12 fibers each. In other embodiments, multi-fiber branches 156 can have more or less than 12 fibers each.

The terminal end of the multi-fiber branches 156 can each have a connector 158 for optically coupling the fibers of the respective multi-fiber branch 156 to an intermediate multi-fiber optic cable 112 (see FIG. 1) or a multi-fiber jumper 163 described in more detail below with reference to FIG. 3. For example, multi-fiber branches 156 can have mechanical transfer connectors 158.

A portion of multi-fiber optic cable 108 is fixedly coupled to back surface 132 of CTA 118. For example, as shown in FIG. 4, a portion of multi-fiber optic cable 108 near the junction of multi-fiber branches 156 and tail portion 154 is fixedly coupled to back surface 132 of CTA 118 using a bracket 160. During installation, an installer can orient CTA 118 such that tail portion 154 is aligned in a desired direction, for example, in the direction of an opening of enclosure 120. As shown in FIG. 4, an installer can orient CTA 118 such that the tail portion 154 is aligned in the direction of arrow A1 when it is desired to have tail portion 154 run downward, for example, when FDH 106 is on a lower story of multi-unit building 100. Similarly, the installer can orient CTA 118 such that the tail portion 154 of CTA 118 is aligned in the direction of arrows A2, A3, or A4 when it is desired to have tail portion 154 run to the left, up, or right (when viewed from the front of CTA 118), respectively.

Base plate 128 of CTA 118 includes an opening 162 for passing multi-fiber branches 156 from the back side to the front side of base plate 128. Connectors 158 of multi-fiber branches 156 are mounted to a front side of base plate 128 of CTA 118. As shown in FIG. 3, connectors 158 are coupled to a plurality of adapters 159 secured on a mounting plate 166. Mounting plate 166 extends substantially perpendicularly from front surface 130 of base plate 128 Mounting plate 166 arranges connectors 158 and adapters 159, for example, in two linear columns, so that they can easily be coupled to an intermediate multi-fiber cable 112 that is optically coupled to one FDT 114 or a multi-fiber jumper 163 described in more detail below.

One or more multi-fiber branches 156 are optically coupled to multi-fiber jumpers 163 via adapters 159 on mounting plate 166. Multi-fiber jumpers 156 are unbundled into a plurality of single-fiber jumpers 164, for example, by using a fan out device (not multi-fiber branch 156. In embodiments in which multi-fiber optic cable 108 has 144 fibers and multi-fiber branches 156 have 12 fibers each, two multi-fiber branches 156 are coupled to two multi-fiber jumpers 163 as shown in FIG. 3. The two multi-fiber jumpers 163 are unbundled to form twenty-four single-fiber jumpers 164 that are optically coupled to twenty-four adapters 140. In embodiments in which multi-fiber optic cable 108 has 72 fibers and multi-fiber branches 156 have 12 fibers each, one multi-fiber branch 156 is coupled to one multi-fiber jumper 163. The single multi-fiber jumper 163 is unbundled to form twelve single-fiber jumpers 164 that are optically coupled to twelve adapters 140.

Multi-fiber jumper(s) 163 provide a disconnect point between tail portion 154 of multi-fiber cable 108 and the single-fiber jumpers 164. This configuration facilitates troubleshooting of signal problems in single-fiber drops 116 and facilitates field repair, for example, replacement of the single-fiber jumpers 164 and/or the fan out device.

Each one of the plurality of single-fiber jumpers 164 is configured to be connected to one end of an adapter 140. The other end of adapter 140 is configured to couple with a single-fiber drop 116, optically coupling single-fiber drop 116 with a respective fiber of single-fiber jumper 164. Adapters 140 optically couple single-fiber jumpers 164 to respective single-fiber drops 116 that terminate at optical network terminals at separate units 102 of multi-unit building 100. The optical network terminals are coupled to other fiber-optic devices within separate unit 102.

Figure 5:
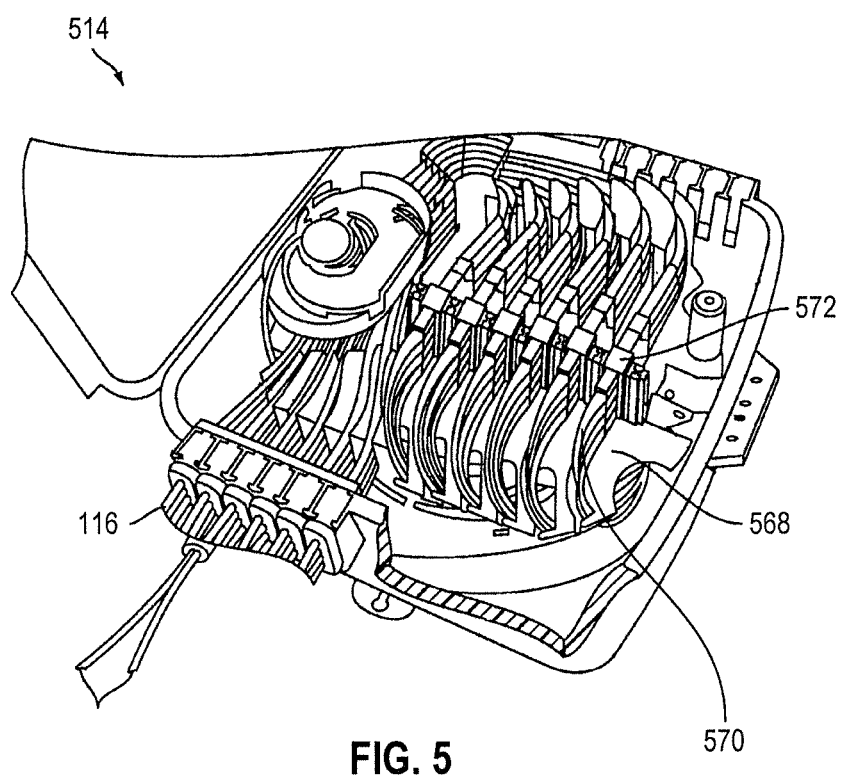
FIG. 5 is an internal view (with the enclosure door open) showing a fiber distribution terminal (FDT) according to an embodiment.

The fiber optic system for use in multi-unit building 100 can also include FDT 114 that is optically coupled to CTA 118 via intermediate multi-fiber optic cable 112. FDT 114 optically couples intermediate multi-fiber cable 112 with a plurality of single-fiber drops 116 for use at single units 102 of multi-unit building 100. For example, FDT 114 can be a fiber distribution terminal as described in above-referenced U.S. application Ser. No. 13/300,727, filed Nov. 21, 2011. FIG. 5 illustrates an embodiment of FDT 114. In some embodiments, FDT 114 can include an adapter plate 568 similar to adapter plate 138 described in the embodiments above. FDT 114 can include a plurality of single-fiber jumpers 570 optically coupled to intermediate multi-fiber cable 112 running to CTA 118. FDT 114 can include adapters 572 that optically couple single-fiber jumpers 570 to respective single-fiber drops 116 that terminate at optical network terminals at separate units 102 of multi-unit building 100. The optical network terminals are coupled to fiber-optic devices within separate units 102.

Accordingly, a collector assembly 110, typically used in multi-unit-building installations, can be omitted from the fiber optic system. Instead, FDH 106 is directly optically coupled to CTA 118. FDH 106 can be coupled directly to multiple CTAs 118 located throughout the multi-unit building; for example, CTAs 118 can be located on every sixth floor. CTA 118 distributes fiber optic signals directly to a single unit 102 of multi-unit building 100, or distributes a fiber optic signal to one or more FDTs 114, which in turn distribute the signal to separate units 102 of multi-unit building 100. Thus, the foot print of the fiber optic system is simplified and reduced.

While an illustrative embodiment of the invention has been described above, it is, of course, understood that various modifications will be apparent to those of ordinary skill in the art. Such modifications are within the spirit and scope of the invention, which is limited and defined only by the appended claims.

The invention claimed is:

1. A fiber optic collector and terminal assembly, comprising:
 a multi-fiber optic cable comprising:
  a tail portion configured to optically couple the fiber optic collector and terminal assembly to a fiber distribution hub separate from the fiber optic collector and terminal assembly, and
  first and second multi-fiber branches optically coupled to the tail portion, wherein the first and second multi-fiber optic branches each have fewer fibers than the tail portion, the first multi-fiber optic branch comprising a first multi-fiber connector, the second multi-fiber optic branch comprising a second multi-fiber connector;
 a first multi-fiber adapter optically coupled to the first multi-fiber optic connector;
 a second multi-fiber adapter optically coupled to the second multi-fiber optic connector;

a plurality of single-fiber optic jumpers optically coupled to the first multi-fiber adapter;
a single-fiber optic drop configured to run directly to one unit of a multi-unit building; and
a single-fiber adapter for securing a connection between a fiber of one of the plurality of single-fiber jumpers and a fiber of the single-fiber optic drop.

2. The fiber optic collector and terminal assembly of claim 1, further comprising:
a base plate configured to be spaced apart from a surface upon which the fiber optic collector and terminal assembly is mounted,
wherein an end of the tail portion that is adjacent the first and second multi-fiber optic branches is coupled to a first side of the base plate facing the surface upon which the fiber optic collector and terminal assembly is mounted, and
wherein the single-fiber adapter is coupled to a second side of the base plate opposite the first side.

3. The fiber optic collector and terminal assembly of claim 1, further comprising a cable guide for routing the single-fiber optic drop from the single-fiber adapter.

4. The fiber optic collector and terminal assembly of claim 3, wherein the cable guide is configured to change a direction of the single-fiber optic drop by up to about 180°.

5. The fiber optic collector and terminal assembly of claim 1, wherein the single-fiber adapter is configured to be slidably movable between a first position and a second position.

6. The fiber optic collector and terminal assembly of claim 1, further comprising a second multi-fiber optic cable optically coupled to the second multi-fiber connector and configured to run directly to a fiber distribution terminal separate from the fiber optic collector and terminal assembly.

7. The fiber optic collector and terminal assembly of claim 1, wherein the first multi-fiber connector and the second multi-fiber connector are mechanical transfer (MT) connectors.

8. The fiber optic collector and terminal assembly of claim 1, wherein the tail portion of the multi-fiber optic cable has 144 fibers or 72 fibers.

9. The fiber optic collector and terminal assembly of claim 1, wherein the first and second multi-fiber optic branches each have 12 fibers.

10. A fiber optic system for use in a multi-unit building, comprising:
a fiber distribution hub;
a collector and terminal assembly separate from the fiber distribution hub, the collector and terminal assembly having:
a multi-fiber optic cable including a tail portion optically coupled to the fiber distribution hub, and first and second multi-fiber branches optically coupled to the tail portion, wherein the first and second multi-fiber optic branches each have fewer fibers than the tail portion,
a plurality of single-fiber optic jumpers optically coupled to the first multi-fiber optic branch,
a first single-fiber optic drop that runs directly to a first unit of a multi-unit building, and
a first adapter for securing a connection between a fiber of one of the plurality of single-fiber optic jumpers and a fiber of the first single-fiber optic drop; and
a fiber distribution terminal separate from the collector and terminal assembly, the fiber distribution terminal having:
a second multi-fiber optic cable, optically coupled to the second multi-fiber optic branch, that runs directly from the collector and terminal assembly to the fiber distribution terminal,
a second plurality of single-fiber optic jumpers optically coupled to the second multi-fiber optic cable,
a second single-fiber optic drop that runs directly to a second unit of the multi-unit building, and
a second adapter for securing a connection between a fiber of one of the second plurality of single-fiber optic jumpers and a fiber of the second single-fiber optic drop.

11. The fiber optic system of claim 10, further comprising a fiber optic device configured for installation in the first unit of the multi-unit building, the fiber optic device being optically coupled to the first single-fiber optic drop.

12. The fiber optic system of claim 10, further comprising a fiber optic device configured for installation in the second unit of the multi-unit building, the fiber optic device being operatively coupled to the second single-fiber optic drop.

13. The fiber optic system of claim 10, wherein the collector and terminal assembly further comprises:
a base plate configured to be spaced apart from a surface upon which the fiber optic collector and terminal assembly is mounted,
wherein an end of the tail portion that is adjacent the first and second multi-fiber optic branches is coupled to a first side of the base plate facing the surface upon which the fiber optic collector and terminal assembly is mounted, and
wherein the first adapter is coupled to a second side of the base plate opposite the first side.

14. The fiber optic system of claim 10, wherein the collector and terminal assembly further comprises a cable guide for routing the single-fiber optic drop from the adapter.

15. The fiber optic system of claim 10, wherein the second multi-fiber optic branch includes a multi-fiber connector for selective coupling with the second multi-fiber optic cable of the fiber distribution terminal.

16. The fiber optic system of claim 10, wherein the tail portion comprises 144 fibers or 72 fibers.

17. The fiber optic system of claim 10, wherein the first and second multi-fiber branches and the second multi-fiber cable each comprise 12 fibers.

18. The fiber optic system of claim 10, wherein the collector and terminal assembly further comprises:
a base plate configured to be mounted to a surface;
an adapter plate coupled to the base plate, the adapter being coupled to the adapter plate;
a mounting plate extending from a surface of the base plate;
a multi-fiber jumper optically coupled to the plurality of single-fiber optic jumpers; and
a second adapter coupled to the mounting plate for securing a connection between fibers of the first multi-fiber optic branch and fibers of the multi-fiber jumper.

19. The fiber optic collector and terminal assembly of claim 1, further comprising:
a base plate configured to be mounted to a surface;
an adapter plate coupled to the base plate, the single-fiber adapter being coupled to the adapter plate;
a mounting plate extending from a surface of the base plate, the first multi-fiber adapter and the second multi-fiber adapter being coupled to the mounting plate; and
a multi-fiber jumper optically coupled to the plurality of single-fiber optic jumpers and to the first multi-fiber connector.

* * * * *